March 12, 1946.　　　　E. O. BLODGETT　　　　2,396,230
TELETYPEWRITING MACHINE
Filed Oct. 28, 1944　　　11 Sheets-Sheet 4

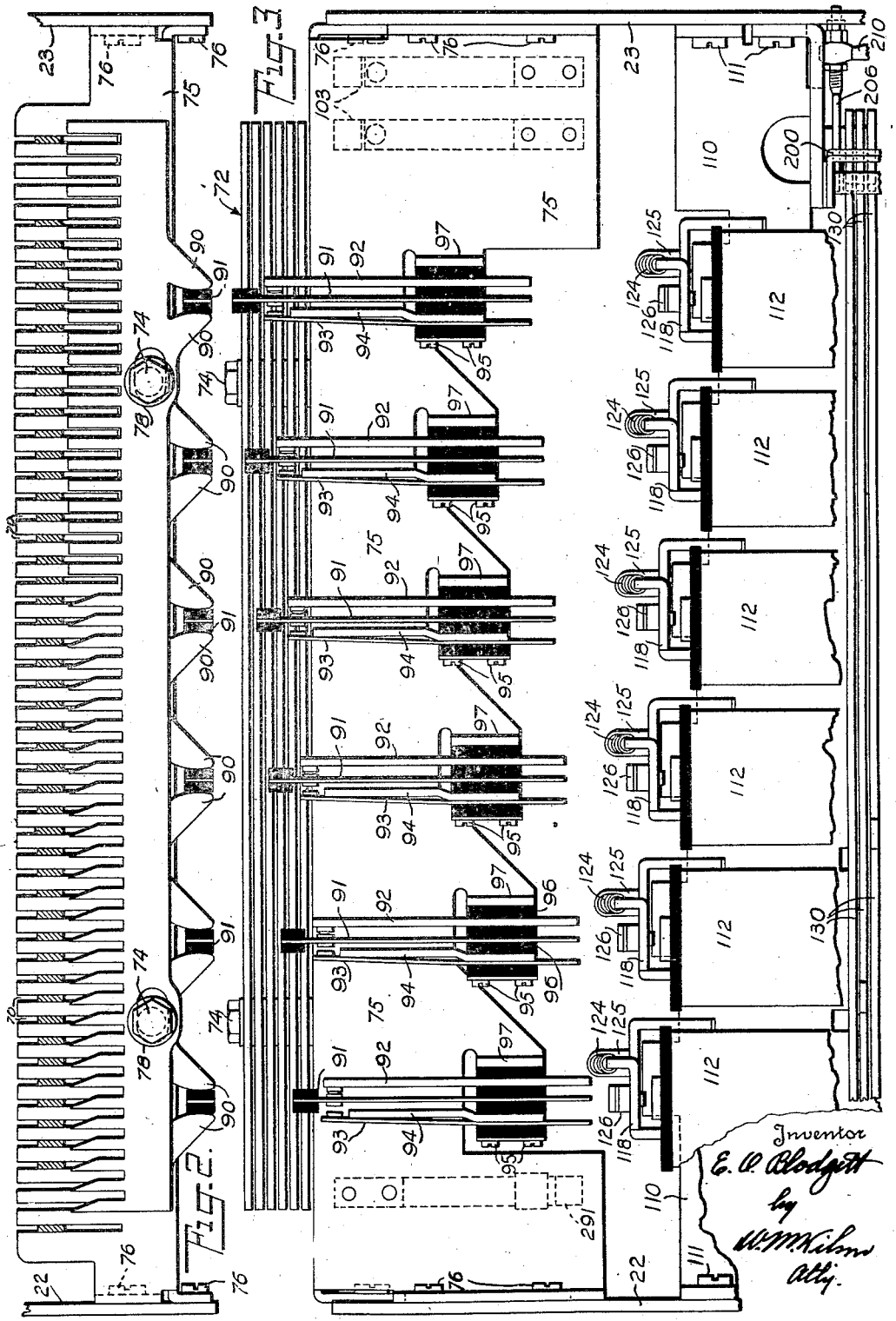

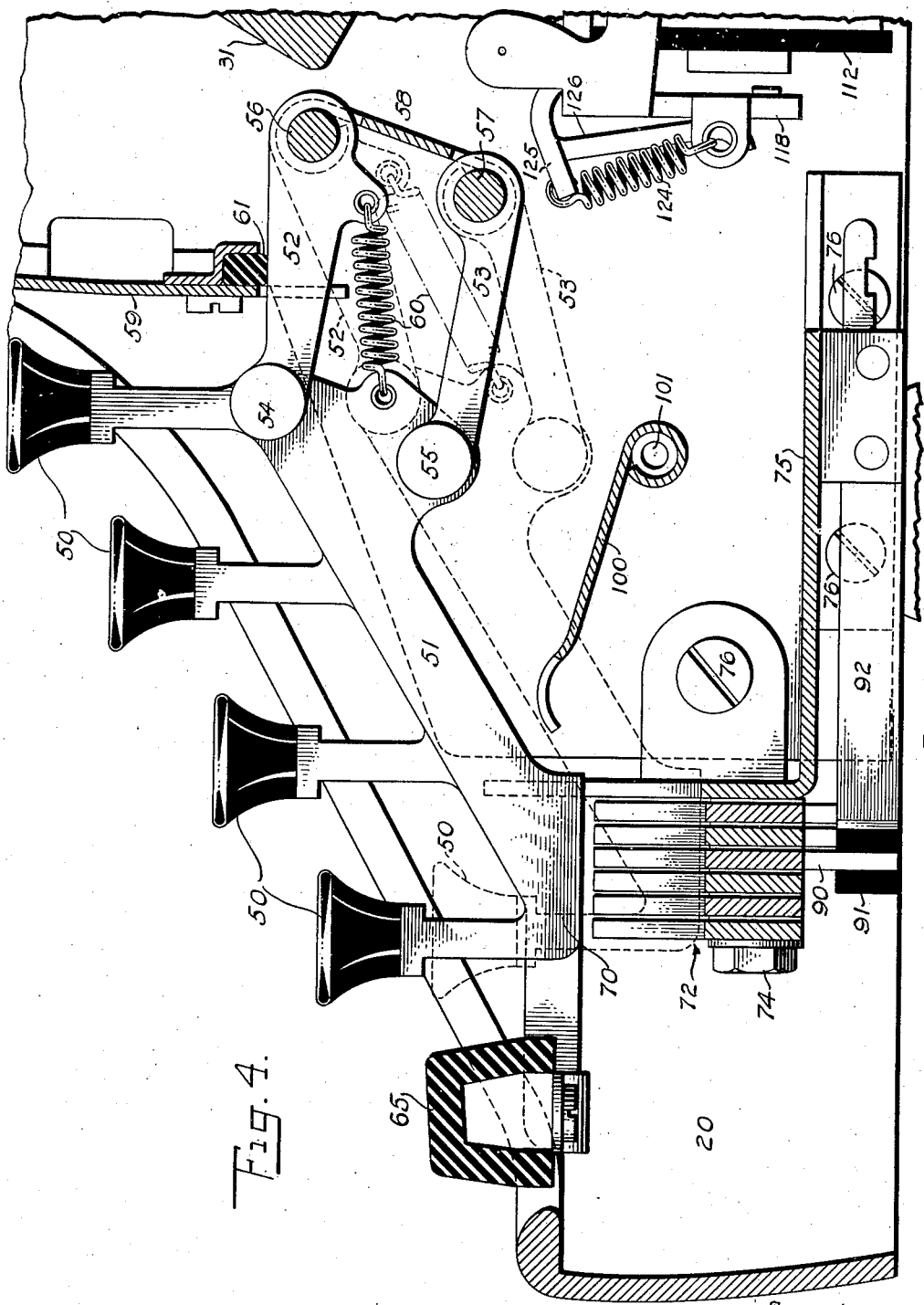

Inventor
E. O. Blodgett
by
W. M. Wilson
Atty.

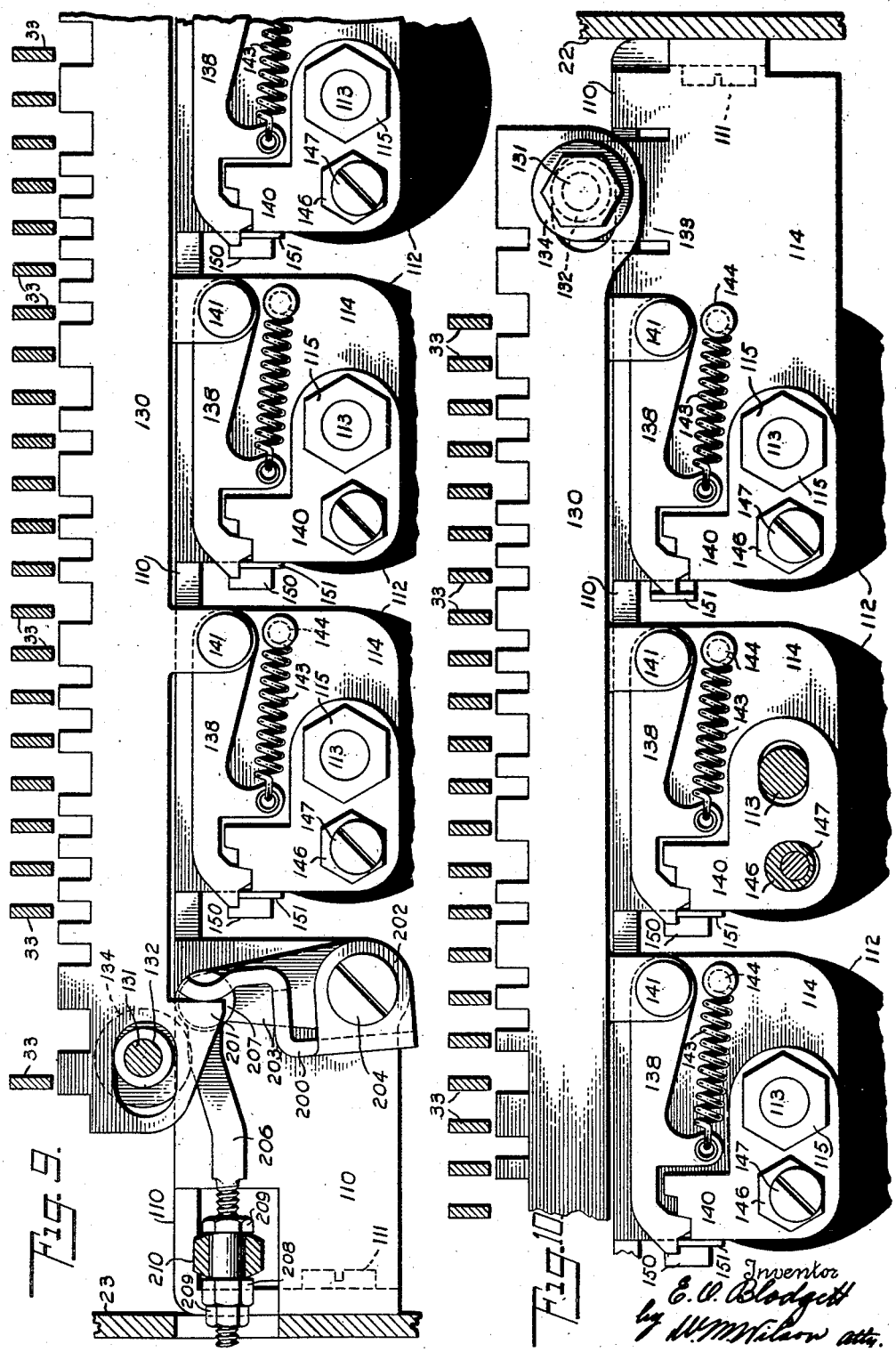

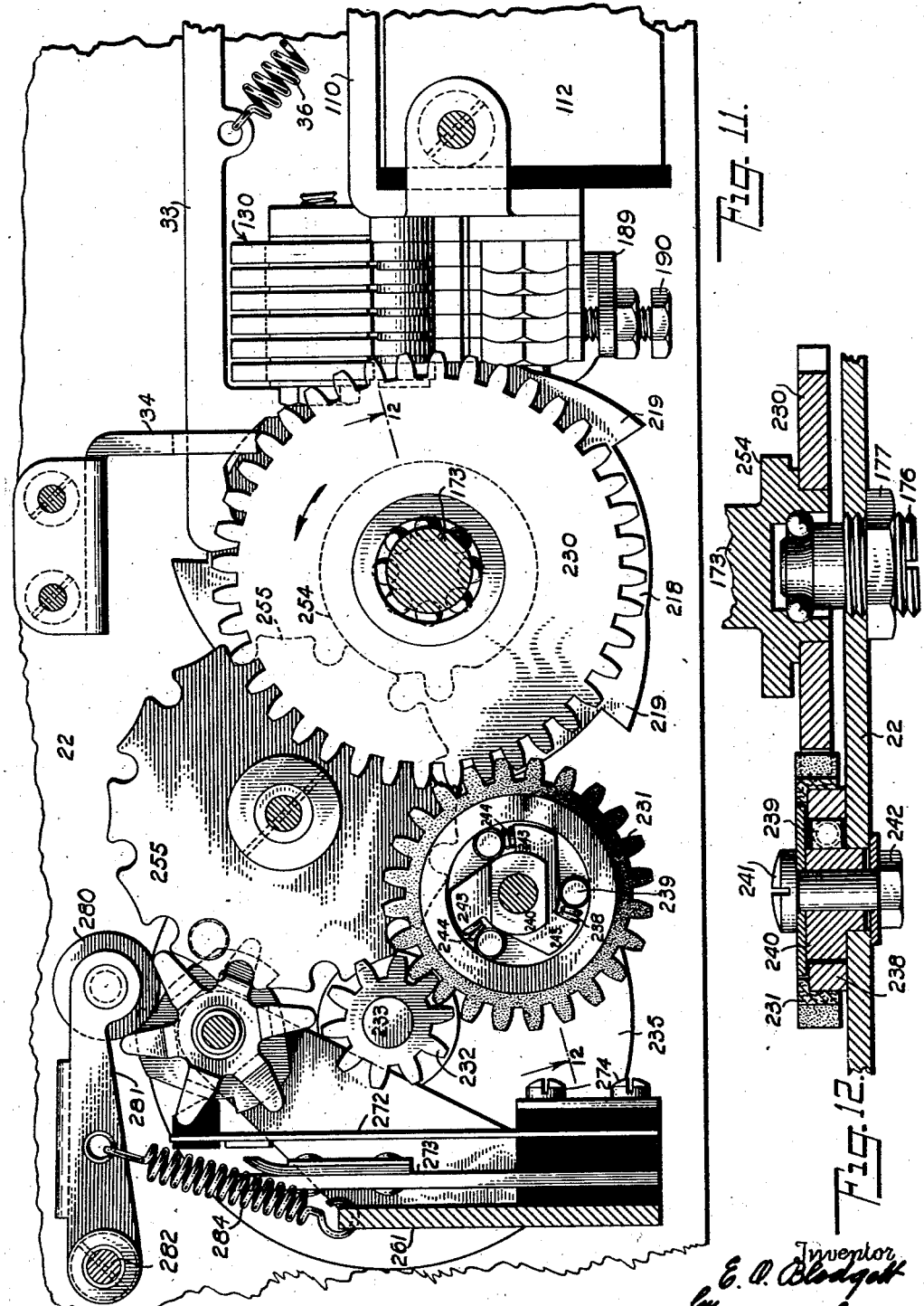

March 12, 1946.  E. O. BLODGETT  2,396,230
TELETYPEWRITING MACHINE
Filed Oct. 28, 1944  11 Sheets-Sheet 10

Inventor
E. O. Blodgett

March 12, 1946. E. O. BLODGETT 2,396,230
TELETYPEWRITING MACHINE
Filed Oct. 28, 1944 11 Sheets-Sheet 11

INVENTOR
E. O. Blodgett

Patented Mar. 12, 1946

2,396,230

UNITED STATES PATENT OFFICE 2,396,230

TELETYPEWRITING MACHINE

Edwin O. Blodgett, Rochester, N. Y., assignor to International Business Machines Corporation, New York, N. Y., a corporation of New York Application October 28, 1944, Serial No. 560,806

6 Claims. (Cl. 178—33)

This invention relates to teletypewriting machines, and more particularly to improvements in machines whereby typewritten messages may be sent to and received from several remotely located points.

In the usual form of power operated teletypewriting machines, a continuously running electric motor is mechanically connected by a clutch mechanism to the sending or receiving mechanism each time a character is transmitted or received. This clutch operation involves a complicated mechanism, and its operation requires a time interval limiting the speed of operation of the machine. The motor in such machines must be turned on and off before and after messages are exchanged, or the motor must be allowed to run continuously with the obvious waste of power and needless wear on the operating parts. Moreover machines of this type are affected by variations in the electric power supply, and are rendered inoperative during a power failure.

It is accordingly an object of this invention to provide a teletypewriting machine wherein the selecting and printing mechanism is operated by an automatically-wound spring motor under control of an escapement mechanism actuated by electrical code impulses. The machine is thus always in condition to instantaneously start operation without preliminary manual conditioning operations of the power operating mechanism. Either when such operation is initiated locally or from a remote machine, no attention whatsoever need be given the power means upon stopping regardless of how long the machine is due to remain idle, and no power is being consumed after stopping. In addition, the speed of the machine is affected by variations and momentary interruptions of the power supply do not affect the machine operation.

The present invention more specifically provides a machine wherein a spring-driven rotary member is released in response to electrical code impulses to make a continuous predetermined extent of movement in one direction, during which, one of a series of type bar operating members is selected, the type bar is operated to cause printing, and the selecting mechanism is returned to a normal position. During this movement of the rotary member, the selecting or permutation bars of the translating mechanism are started in their return movement during the forward or printing movement of the type bar, and the selecting bars are fully returned to normal position before the type bar returns to its normal position. This permits a character to be selected during the cycle of operation of the type bar previously selected so that the selecting and printing operation of these machines may overlap. In the selector mechanism, the electrical impulses operate magnets which trip the selecting bars which are spring operated and positively or forcefully returned to normal position and latched therein, regardless of whether or not the magnets are deenergized.

In accordance with the present invention, it is proposed to provide an arrangement whereby the coded electrical impulses are selected by contacts operated directly by the key levers with the printing type bars at the same machine controlled by the previously mentioned magnets energized by these contacts. In addition, corresponding magnets at one or more remotely located machines are energized by these contacts to cause the same printing at the remote point as at the local point. In this manner, the printing at the machine where the keyboard is being operated is caused by the same coded impulses which cause printing at the remote machine, thereby furnishing a check on the accuracy of the transmitted message.

A further advantage of this arrangement is that there is no mechanical connection between the key levers and the type bars which permits the use of a standard keyboard and yet affords any desired arrangement of the type bars in the type basket. It is well recognized that the standard typewriter keyboard ordinarily requires a distribution of type bars in the basket which restricts the speed of operation of the machine due to the fact that many characters which are often operated in sequence are positioned on adjacent type bars and accordingly collide at high speed. It is accordingly proposed to reduce the possibility of type bars colliding and thereby increase the speed of operation of the present machine by separating the characters which are ordinarily used in sequence so that they are not positioned on adjacent type bars.

Still further objects of the present invention include an arrangement of the contact operating bars whereby these bars are operated by the initial movement of the key levers and are held in this operated position by further movement of the levers. This mechanism also provides an effective key lever interlock whereby only one key lever can be effectively depressed at one time. A further important feature of this contact operating arrangement resides in the provision of a plurality of common contacts which are closed after the individual code selecting contacts are closed and open before the individual contacts are opened. Thus the flow of current in all the individual code circuits is controlled only by these common contacts, and in order to increase the life and the reliability of these contacts individual shunt resistors are placed in multiple with each of the common contacts so that the total load is distributed between the several common contacts.

Still other objects of the present invention will be pointed out in the following description and claims and illustrated in the accompanying drawings which disclosed, by way of example, the principle of the invention and the best mode which has been contemplated of applying that principle.

In the drawings:

Fig. 2 is a partial front vertical sectional view showing certain parts of the code selecting mechanism of the machine shown in Fig. 1.

Fig. 3 is an inverted plan view of the front portion of the machine.

Fig. 4 is a greatly enlarged side sectional view of a portion of the code selecting mechanism.

Fig. 9 is an enlarged rear sectional view to the left-hand portion of the machine showing the character selecting magnets and certain associated parts.

Fig. 10 is a view similar to Fig. 9 except showing the right-hand portion of the mechanism.

Fig. 11 is an enlarged side sectional view of the automatic winding mechanism.

Fig. 12 is a horizontal section taken on line 12—12 of Fig. 11.

Figure 1:
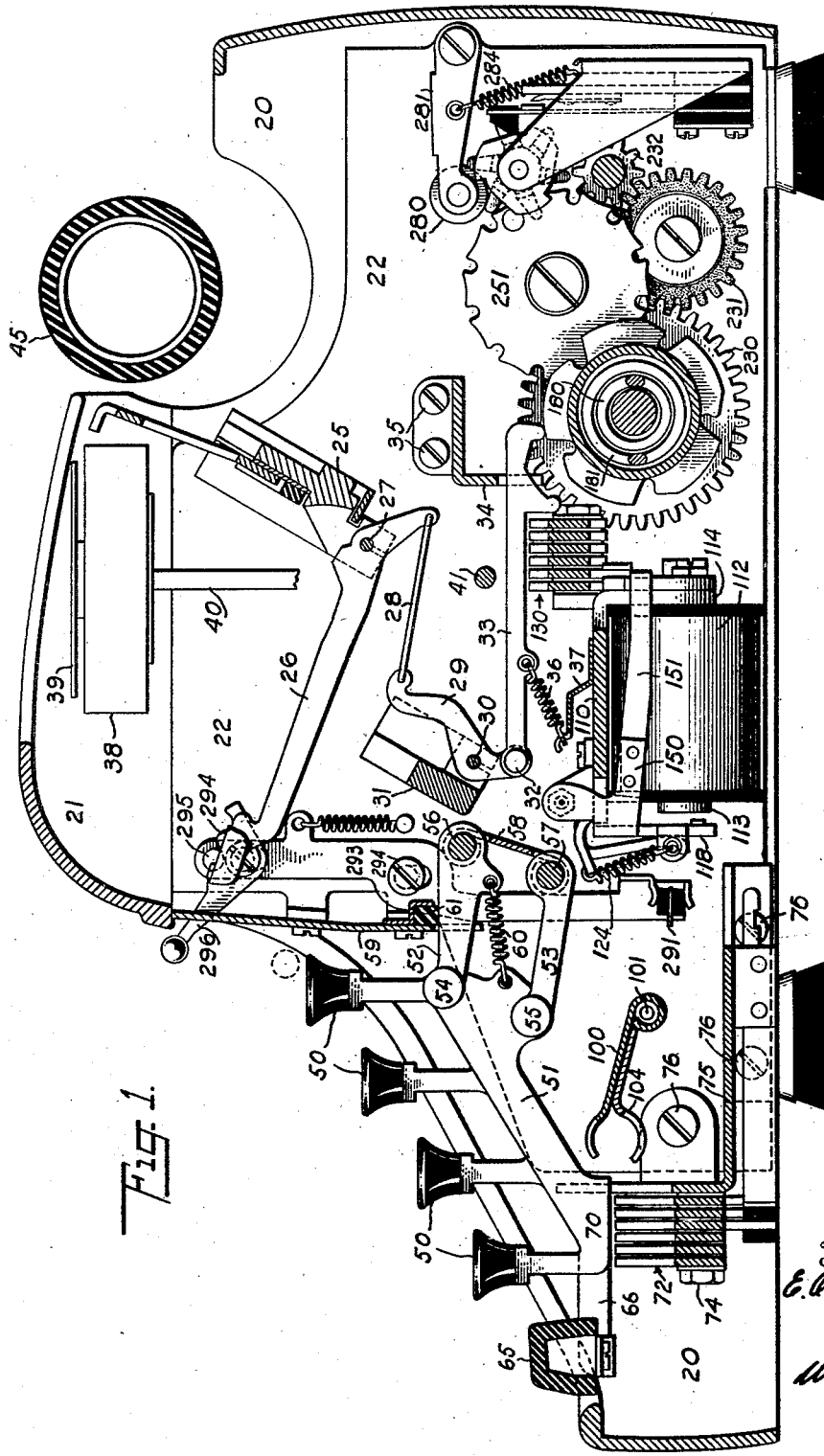
Fig. 1 is a side sectional view of one form of teletypewriting machine embodying the present invention, wherein certain conventional parts of the machine have been omitted in order to more clearly show the novel features thereof.

All of the parts of the machine shown in the accompanying drawings are housed within an exterior frame which may be similar in design to the conventional form of typewriting machines. This exterior frame includes a main frame 20 consisting of right and left side walls and front and rear end walls, the top of the main frame being partially enclosed by a removable top cover 21. An inner frame or chassis is suitably mounted within the exterior frame, and substantially all the parts of the present machine are mounted within this chassis. The chassis includes left and right side plates 22 and 23 rigidly inter-connected by various cross members as in the usual typewriter construction.

Typewriting mechanism

Various parts of this machine which are directly concerned with the printing operation may be identical with any suitable typewriter design, and the detailed construction of some of these well known parts has not been shown in the drawings. For example, the illustrated type basket assembly is substantially the same as that used in the Royal portable typewriter, and this assembly includes a slotted segment 25 which may be rigidly mounted between the side plates 22 and 23 or shiftably mounted in the usual manner depending on whether or not case shift is employed. The illustrated type bar 26 represents one of a full complement of such type bars mounted in the segment 25 to turn about a fulcrum wire 27, and in the present form of the machine there are forty-six of these type bars employed.

A depending arm of each type bar is connected by a pull wire 28 to the upper end of an associated sub-lever 29 pivotally mounted on a fulcrum wire 30 in a slotted cross member 31. The lower end of each sub-lever 29 is pivotally connected at 32 to a rearwardly extending pull link 33, and all of the pivots 32 and pull links 33 are disposed in a common horizontal plane. The sub-levers 29 progressively increase in length from the center toward the sides of the machine in accordance with the usual arrangement, and in order that all of the pivots 32 may lie in a common horizontal plane, a curved fulcrum wire 30 is employed whereby the pivot points are so positioned between the upper and lower ends of each sub-lever that the same rearward movement of each pull link 33 will cause a uniform extent of movement of the associated type bar regardless of the length of the sub-lever.

The rearward ends of the pull links 33 are retained in spaced parallel relation by a guide comb member 34 extending transversely on this machine and mounted at its opposite ends at 35 to the side plate 22 and in a similar manner to the side plate 23. A spring 36 connected to each pull link 33 serves to return the entire type action to normal position against a suitable stop which may be the usual type bar rest disposed beneath the heads of all of the type bars 26. The lower ends of all of the springs 36 are connected to a transverse stationary member 37.

Other parts of the printing mechanism may be of the usual construction, such as the ribbon mechanism which is partially shown in Fig. 1, as including a housing 38 for a ribbon spool 39 mounted on a vertical shaft 40 which is turned in the usual manner by a transverse ribbon feed shaft 41.

When it is desired to print in page form by vertically spaced lines the usual platen carriage arrangement is employed. A platen is illustrated at 45 in Fig. 1, and it is to be understood that this platen is to be mounted in the usual manner on a carriage to move transversely of the machine for character spacing and to rotate for line spacing. The details of the carriage construction have not been shown, but may be of any suitable design arranged to be moved from right to left by a suitable spring drum under control of the usual escapement mechanism. Either the usual manual or power mechanism may be provided for returning the carriage and rotating the platen for line spacing. If it is desired to print on continuous narrow tape, a smaller platen may be employed to turn about a substantially vertically disclosed axis to feed the tape past the printing point.

Code forming mechanism

In the present machine there are no mechanical connections between the key levers and the type bars, but the operation of a key lever sets up a distinctive code in the form of electrical impulses which causes the selection and operation of the corresponding type bar at the same machine as well as at one or more other machines electrically connected therewith.

A standard, four-bank keyboard is illustrated by keys 50 each mounted on a vertically moving member or lever 51. All of the levers 51 are identical in shape except for the upward extension which mounts the keys in separate banks. Each lever 51 is mounted by parallel links 52 and 53 pivotally connected thereto at 54 and 55. The rearward ends of the links 52 and 53 are mounted to turn about respective stationary cross rods 56 and 57, and are spaced along these rods by a transverse member 58 having portions slotted and formed around the rods between the various arms 52 and 53.

The rearward ends of levers 51 are retained to spaced parallel relation by a guide comb formed at the lower end of a front plate 59 to receive the upper link 52. A spring 60, extending between each key lever 51 and a depending arm on the associated upper link 52, operated to return the key lever mechanism to normal position. This normal position is determined by the engagement at the upper edges of links 52 with a transverse pad 61 carried by plate 59. A space bar 65 extends between two arms 66 which are similar in shape and mounting to the levers 51 and these space bar arms are disposed outside the set of character key levers.

A horizontal portion 70 is provided at the lower front part of each of the key levers 51 as well as one of the two members 66 carrying the space bar 65. These portions 70 are all identical in size and shape and all cooperate with a plurality of code-forming bars 72. The bars 72 are mounted for transverse sliding movement by screws 74 threaded into the upturned front edge portion of a cross member 75. The cross member 75 is mounted at its opposite ends at 76 to the side plates 22 and 23, and the vertical portion of the cross member is slotted to form a guide comb for the front end of key levers 51. The stem portions of screws 74 pass through horizontal slots in bars 72 so that each bar may be independently and easily moved transversely at this machine. The code-forming bars 72 may be separated slightly by thin spacing washers 78 also mounted on the stem portions of screws 74.

Figure 5:
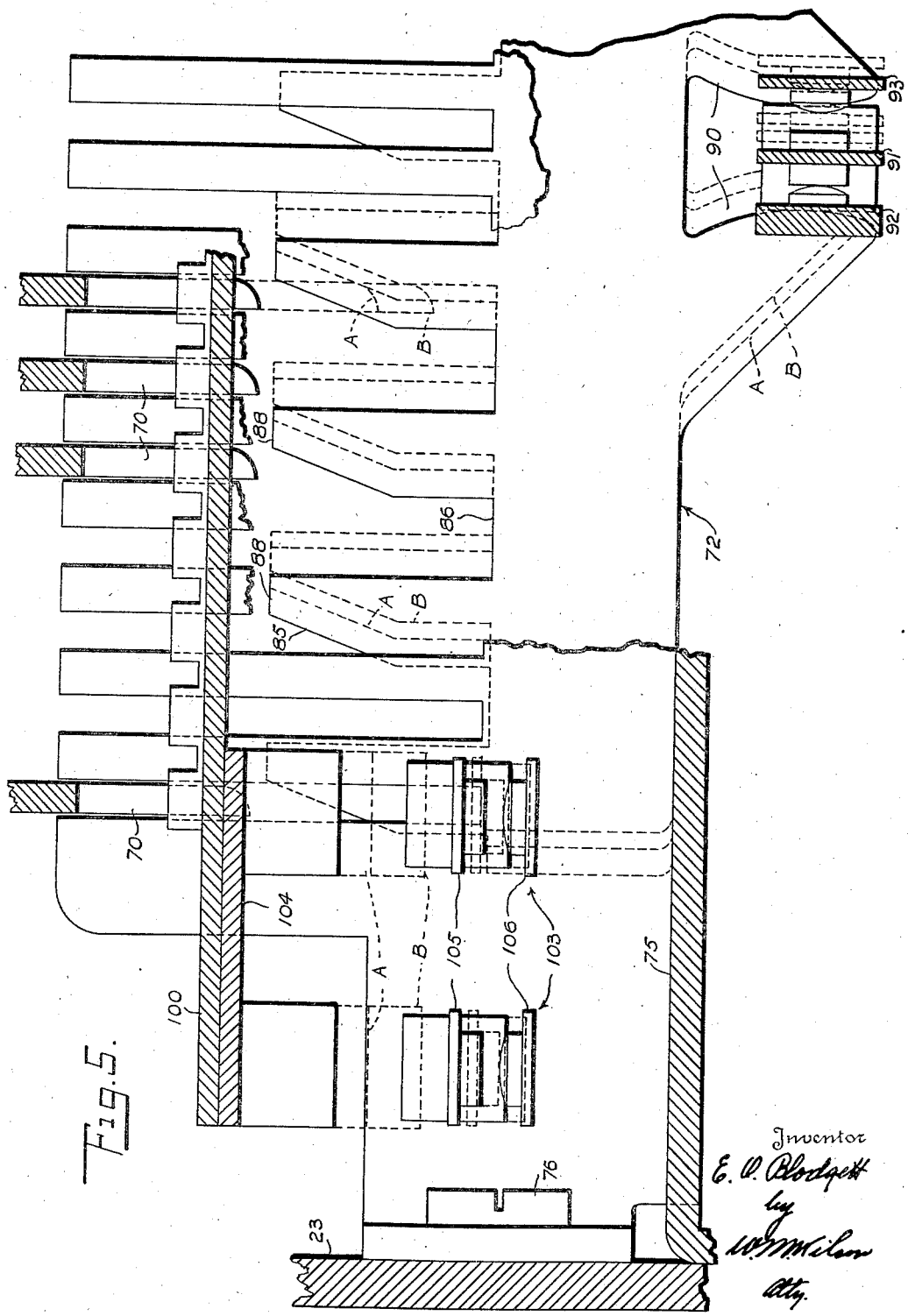
Fig. 5 is a front sectional view of certain parts of the mechanism shown in Fig. 4.

The arrangement of this code forming mechanism is shown more clearly in Figs. 4 and 5 wherein it will be noticed that the portion of each bar 72, which lies directly underneath each operating portion 70 of the key lever, is either provided with an inclined edge portion 85 or an opening 86. The lower edge of the key lever operating portion 70 may be slightly rounded as shown in Fig. 5 so that when a key lever is depressed, this rounded edge either engages a sloping edge surface 85 to cause a slight transverse movement of a code-forming bar 72, or the rounded edge portion moves downwardly in an opening 86 and does not cause movement of the bar. It will be noted that the inclination of the edge 85 terminates short of the complete movement of the key lever and accordingly the bars 72 are operated the same distance regardless of variation in the stroke of the key levers.

Figure 13:
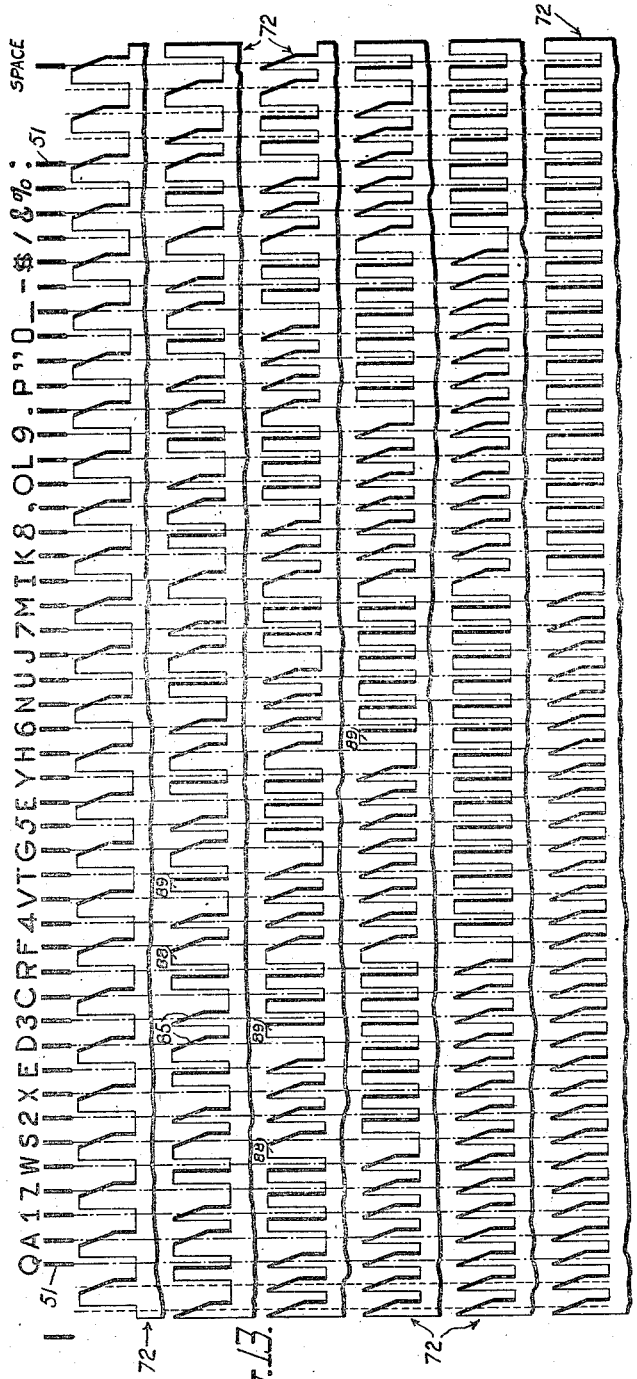
Fig. 13 is a diagrammatic view showing one arrangement of the code selecting members.

A typical arrangement of the portions 85 and 86 for each of the six code-forming bars is shown in Fig. 13. These bars are so arranged in each instance that a depression of any key lever causes a different combination of movements of the code-forming bars than is caused by the depression of any other key lever.

A particular feature of this arrangement of the code-forming bars 72 operated directly by the key levers is that more than one lever cannot be effectively depressed at the same time. In other words, each code-forming bar is provided with a locking portion 88 between the inclined-edge portion 85 and the opening 86, and as may be seen in Fig. 13, a locking portion 89 is provided between adjacent openings. These portions 88 and 89 are positioned beneath the lower edges of the non-operated key levers when the code forming bars are moved longitudinally by a depressed key lever to prevent effective downward movement of these non-operating key levers. Likewise, if a key lever is operated into an opening 86 in a code forming bar, the walls of the opening will prevent movement of this bar by engagement with the side of the depressed key lever and thereby prevents effective depression of another key lever which would engage an inclined portion 85. In this manner the coding bars, when positioned by a depression of any one of the key levers, function collectively to prevent effective operation of all of the other key levers.

The operation of any one of the key levers moves at least one of the code-forming bars 72 from right to left as viewed from the front of the machine as in Figs. 2, 3, and 13, or from left to right as viewed from the rear of the machine as in Fig. 5. Each of the several code-forming bars 72 is provided with a depending bifurcated portion 90 as shown in Figs. 2 and 5, and these portions are differently positioned transversely of the machine on different bars. Each depending portion 90 straddles an insulating block at the front end of a resilient contact finger 91. This contact finger 91 may be tensioned to return the associated bar to the right wherein a contact point on this finger engages a contact point on a rigid arm 92. When a code-forming bar is moved by depression of the key lever, the finger 91 is moved to engage this contact point with a contact point on a resilient finger 93, but normally there is no electrical connection between the fingers 91 and 93.

The rigid arm 92 thus forms a stop determining the normal right-hand position of the code-forming bars 72, and the arm 92 may be bent with a suitable instrument for adjusting this normal position. A rigid stop arm 94 is mounted adjacent to each of the contact fingers 93 to be engaged by the finger 93 and thereby determines the normal separation between the contact points of fingers 91 and 93. The arm 94 may likewise be bent with a suitable instrument to adjust this contact point separation in accordance with the adjustment of the normal position of the associated code-forming bar obtained by bending arm 92. It is believed that the resilient members 91 may be provided with sufficient tension to reliably return the relatively light and easily moved code-forming bars; but, if desired, auxiliary returning springs may be provided.

The contact members 91, 92, 93, and 94 are mounted in the usual manner by screws 95 and insulating strips 96 to form individual groups. Each of these groups is mounted on respective downwardly extending lugs 97 formed on the cross members 75. There is a group of these contacts for each of the code-forming bars 72, and the groups are spaced transversely and slightly offset rearwardly so that each insulating block at the front end of the arm 91 is disposed directly beneath the associated bar as shown in Fig. 3.

In addition to operating the code-forming bar 72, each of the key levers and the space bar operate a universal member. This universal member is formed by a transverse plate 100 pivotally mounted at 101 between the side plates 22 and 23, and the front end of the plate is slotted to form individual fingers disposed beneath the key levers and space bar lever. The universal member is arranged to operate one or more sets of contacts, such as the two sets of contacts 103 shown in Fig. 3 and Fig. 5. A bifurcated member 104 is secured to the right-hand end portion of the universal member 100 to form two downwardly extending fingers. Each of these fingers is positioned above an insulating block at the front end of a resilient contact finger 105 which carries a contact point operable into engagement with a contact point on a lower contact finger 106. These contact fingers are mounted in insulated relation on the upper surface of cross member 75. The universal member 100 is engaged and operated by a depression of any one of the key levers, and the bifurcated member 104 is so arranged that its fingers engage and operate contact fingers 105 into circuit closing relation with contacts 106.

In operating any one of the key levers, it will be clear that one or more of the code-forming contacts 91—93 are closed and the common contacts 105—106 are also closed, but in the present arrangement the fingers of the member 104 are so adjusted that the longitudinal movement of the slide 72 will close contact 91—93 before the universal member closes contacts 105—106, and when the key lever is being returned, contacts 91—93 remain closed until after contacts 105—106 are opened. This is illustrated by the dotted line position of the various parts illustrated in Fig. 5 wherein it will be noted that when a key lever is operated into position A, a code-forming bar 72 is moved to position A which closes contact 91—93, but position A of the fingers of the universal member 104 does not engage removable contact finger 105. Further movement of the key lever to position B maintains contact 91—93 closed and moves member 104 to position B which closes contact 105—106. In returning to normal position, the fingers 104 will obviously allow contacts 105—106 to open before contacts 91—93 open.

*Code translating mechanism*

The contacts operated by the code-forming bars 72 control electromagnets of code translating mechanism in the same machine as well as like mechanism in one or more other machines. In this translating mechanism, there is one electromagnet for each group of contacts operated by the bars 72. Referring to Fig. 3, it will be seen that in the form shown, there are six code-forming bars, six groups of contacts, and six electromagnets; each of the groups of contacts and each of the electromagnets being identical in construction to the others.

The electromagnets are all mounted in transverse spaced relation beneath a cross member 110 of suitable magnetic material secured at 111 at its opposite ends to the side plates 22 and 23. Referring to Figs. 1, 9, and 10, it will be seen that each electromagnet includes a winding 112 around a magnetic core 113 which has a reduced diameter rearward end extending through an associated downwardly bent portion 114 of cross member 110. This winding and core are secured to the portion 114 by a nut 115 so that a U-shaped magnetic circuit is formed by the core 113, and downturned portion 114, and a section of the cross member 110; the cross member 110 being common to the magnetic circuits of all of the electromagnets. All of the electromagnets are arranged to form the same magnetic pole at the free ends of their cores 113 when current in the normal direction flows in their windings 112.

A tractive type armature 118 is mounted to operate toward the free end of core 113 of each of the electromagnets, and the armature is pivotally mounted by spaced upstanding ear portions which receive cone-shaped ends of trunnion screws 119. The screws 119 are locked in adjusted position by nuts 120 on a bracket 121 which is adjustably mounted by screws 122 on the upper surface of the cross member 110. An armature biasing spring 124 extends between a lug at the lower portion of each armature 118 and a bendable extension 125 formed on bracket 121. This spring normally holds the armature against a stop arm 126 which is also a bendable extension of bracket 121. The members 125 and 126 are bendable with a suitable tool to adjust the position and operating characteristics of armature 118, and a fixed residual pin or stop 127 is shown on armature 118 to limit its operated or attracted position.

Figure 6:
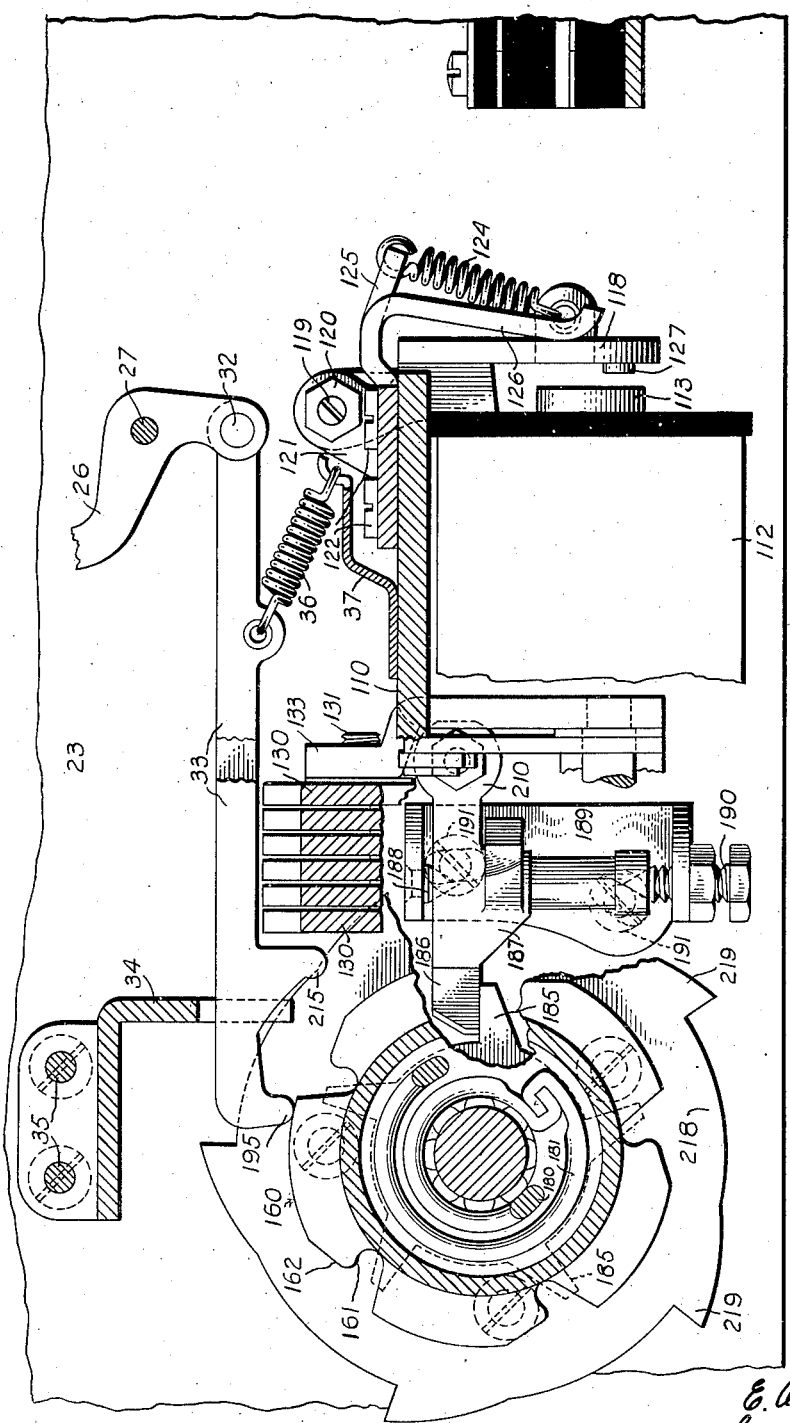
Fig. 6 is an enlarged side sectional view of a portion of the character selecting mechanism.

Each armature controls a permutation or selecting bar 130, there being six of such bars all mounted transversely of the machine beneath the pull links 33. As shown in Figs. 6, 9, and 10, these selecting bars are mounted for individual end-wise movements by screws 131 having rollers 132 which are engaged by the upper wall of slots in bars 130 to afford free longitudinal movement of each bar. The screws 131 are threaded into upstanding lugs 133 on cross member 110, and the bars 130 may be separated slightly by thin facing washers 134.

Means are provided for individually moving each of the bars 130 to the left from their normal position as viewed from the front of the machine, or to the right from normal position as viewed from the rear as in Figs. 9 and 10. A latch member 138 co-acts with a stop member 140 to normally hold each selecting bar in normal position. Each latch member 138 is pivotally connected at 141 to a depending lug on the associated bar 130, and the free end of the latch member 138 has a downward projection normally engaged in a lower notch on the stop member 140. A spring 143 extends between each latch 138 and a pin 144 on the magnet support 114. This spring resiliently holds the latch in the normal position, and when the free end of the latch is moved upwardly the spring acts to draw the latch member and the associated bar 130 to the right as viewed in Figs. 9 and 10.

This movement of the latch member and the selecting bar is limited by the engagement of the downward projection of latch member 138 with a second or upper notch in the stop members 140. Each of the stop members 140 is adjustably mounted on the associated depending portion 114 by an eccentric member 146 which is locked in adjusted position by a screw 147 threaded into the member 114. A portion of the stop member 140 extends beneath the nut 115 on the magnet core and is thereby securely clamped in adjusted position.

The movement of each of the selecting bars 133 from normal position under the force of spring 143 is initiated by an operation of the associated armature 118. For this purpose, a rigid arm 150 is provided on the right-hand side of each armature 118 as shown in Fig. 1, and a laterally-flexible arm 151 is rigidly attached to this arm. The rearward end of arm 151 is disposed beneath the nose of the latch member 138 so that attraction of armature 118 due to energization of the associated winding 112 causes the end of arm 151 to lift latch member 138 upwardly against the slight downward force of the associated spring 143. This allows spring 143 to move the associated bar 130 until the end of the latch member engages the upper or second notch in stop member 140.

Each armature is adjusted to operate the end of arm 151 a distance slightly greater than required to lift the latch out of the lower notch. Thus when the latch is released, the nose of the latch passes to the right of the arm 151, and the arm moves upwardly past the end of the latch nose. If for any reason the magnet remains energized for an undue length of time as would be caused by holding a key depressed, the selecting bar and latch may be returned to normal position with the arm 151 in this raised position. In this instance, the laterally-flexible arm 151 will be bent to the left by the end of latch 138 as shown at the extreme right in Fig. 10. The latch is thus allowed to move into the lower notch even though the arm 151 is raised, and when the magnet is deenergized, the end of arm 151 will move downward and to the right to its normal position beneath the latch nose. In this manner, unintentional repeat operation is prevented in the event a key is held in its depressed position.

Figure 14:
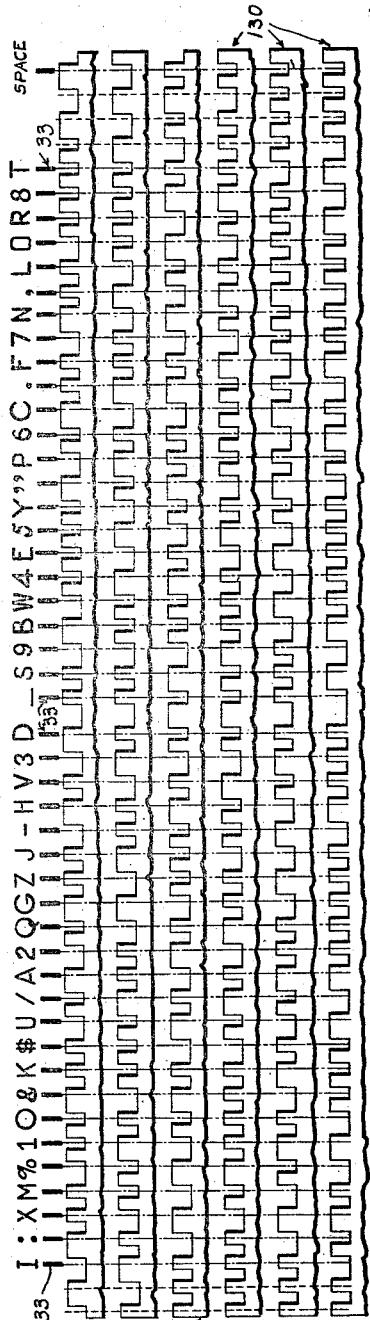
Fig. 14 is a similar view showing a corresponding arrangement of the character selector members.

The uppermost portion of all of the selecting bars 130 just clear the lower edges of pull links 33, and the upper portion of these bars are provided with notches and teeth so that there is either an opening or a tooth disposed directly beneath each pull link. These notches and teeth are arranged as shown in Fig. 14 so that when the bars 130 are operated in a particular combination, a notch on every bar will be disposed beneath only one pull link, and a tooth on at least one bar will be disposed beneath all of the other pull links. Each group of contacts of the code-selecting mechanism is electrically connected to control the associated electromagnet of the translating mechanism, as will be later described, and accordingly each code-forming bar 72 operated by a depression of a key lever causes an operation of the associated translating bar 130 in the same machine as well as in one or more other machines. Thus, any combination of movements of the code forming bars 72, caused by depression of a particular key lever, results in the same combination of movements of the translating bars 130; and thereby selects a pull link 33 corresponding to the depressed key lever.

In Fig. 13, a series of key levers 51 are diagrammatically indicated in spaced horizontal relation, and the characters assigned thereto are indicated above each key lever. This distribution of characters is necessitated by the arrangement of the standard typewriter keyboard. In Fig. 14, a series of pull links 33 is shown in a similar manner, and the character on the type bar associated therewith is shown above each of these pull links. However, the distribution of characters in Fig. 14 does not correspond to the distribution of characters in Fig. 13, or in other words, the characters associated with the pull links 33 and their type bars are not distributed in the manner ordinarily required by a standard typewriter keyboard arrangement.

In a typewriting machine employing the individual type bars, it is well known that two adjacent type bars cannot be operated as rapidly in sequence as two type bars which are disposed in space relationship in the type basket. This is due to the converging angles of movement of the type bars which cause adjacent type bars to interfere at a point nearer their normal position than two separated type bars. However, in the usual typewriter certain letter combinations often used in sequence in rapid operation are disposed on adjacent type bars, because they are so arranged in the standard keyboard. This is one factor limiting the maximum speed of operation of ordinary typewriting machines, and the arrangement of characters shown in Fig. 14 is provided to improve this condition. For example, it will be noticed that the letters "E" and "D" are located on adjacent key levers in Fig. 14, and in the usual typewriter the type bars bearing these letters are located adjacent to each other in the type basket. However, in Fig. 14, it will be noticed that the letters "E" and "D" are on type bars which are separated by six other type bars thereby increasing the speed at which these two type bars may be operated in sequence. Other letter combinations often used in sequence in rapid operation are likewise separated in Fig. 14. This has been accomplished by distributing the numerals and punctuation marks between the letters as well as by selecting the letter combinations most often used in rapid operation and deliberately separating these letters in the arrangement of type bars.

Figure 15:
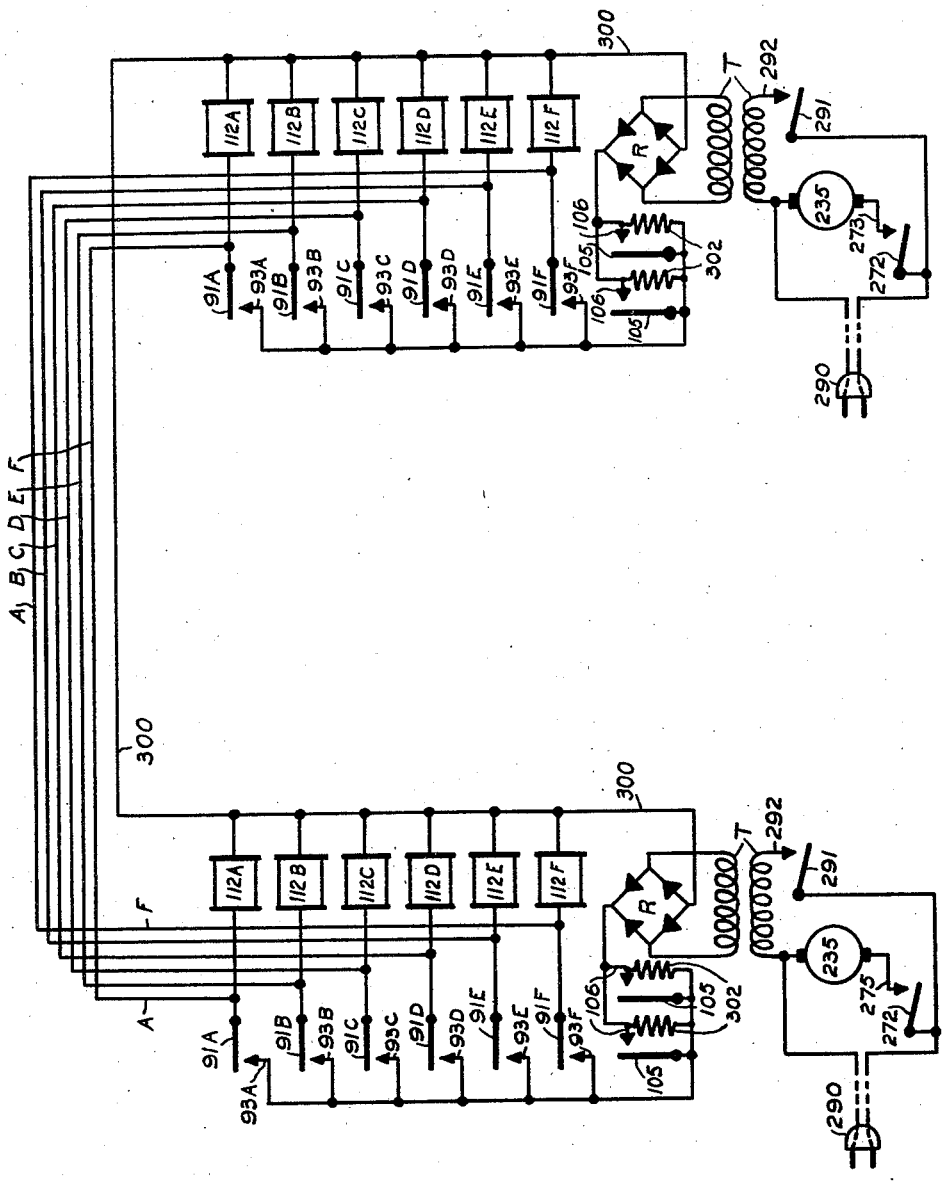
Fig. 15 is a schematic wiring diagram showing one simple method of electrically connecting two machines.

A scientific arrangement of the characters in the type basket such as shown in Fig. 14 is permitted due to the fact that there is no mechanical connection between the key lever and the type bar in the present machine, so that the standard typewriter keyboard has no relation and no limiting influence on the distribution of characters in the type baskets. It is to be understood that the example shown in Fig. 15 is not the only arrangement for producing this improved result, and it is not necessarily the best arrangement which may be obtained. It is, however, at least one arrangement which reduced the possibility of collision of type bars during extremely rapid operation as compared with the arrangement of characters on the type bars of the usual typewriting machines.

*Operating mechanism*

A single, intermittently-operating rotating member is provided in accordance with the present invention, which operates to first allow all of the pull links 33 to move into selective cooperation with the selecting bars 130, and this rotating member then causes longitudinal movement of one of the pull links 33 which is selected by the bars to cause operation of the associated type bar and print the selected character. During this longitudinal movement of the pull link, all of the selector bars 130, which had been released, are returned to their normal position by an arrangement operated by the rotating member.

Figure 7:
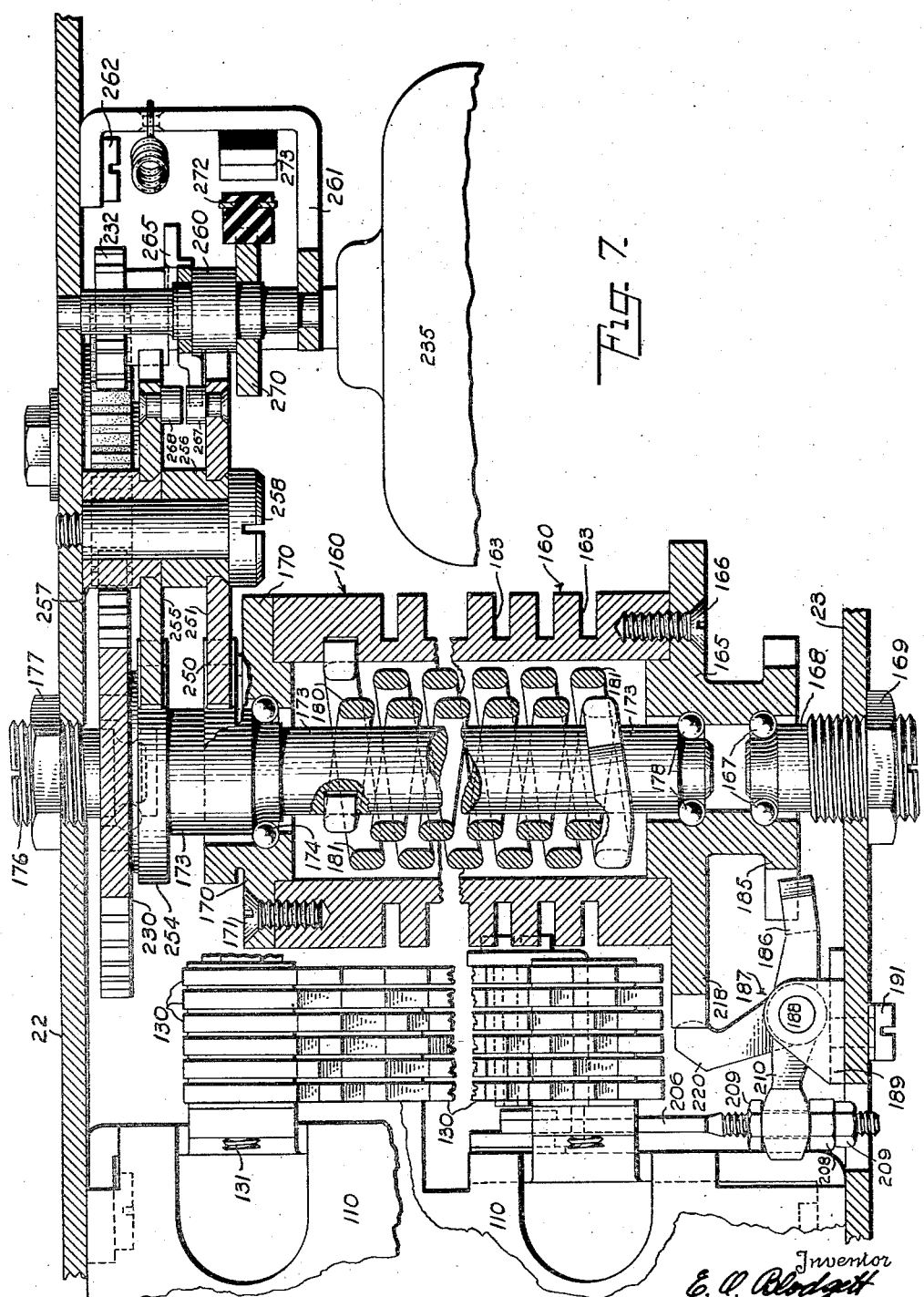
Fig. 7 is an enlarged horizontal sectional view of the end portions only of the character selecting mechanism.

Referring particularly to Figs. 6 and 7, this rotating member is in the form of a metal cylinder or roll 160 having a plurality of evenly spaced longitudinal grooves, there being five of such grooves in the form shown. Each of these longitudinal grooves in roll 160 is cut therein to the shape shown in Figs. 6 and 8 to provide an operating surface 161 and an inclined surface 162. The peripheral portions between these grooves are concentric with the axis of the roll. These longitudinal grooves may be cut throughout the entire length of the cylinder which forms roll 160, and in order to reduce the weight of this part, annular groove 153 may be cut therein at points between the horizontally spaced pull links 33.

The right hand end of roll 160 is provided with an end member 165 attached thereto by screws 166 which member is provided with a ball race receiving anti-friction balls 167 which also engage a stationary cone member 168 threaded through side plate 23 and locked in adjusted position by a nut 169. The left-hand end of roll 160 is likewise provided with an end member 170 secured thereto by screws 171. This end member 170 is mounted to turn about a shaft 173 by an anti-friction ball bearing arrangement 174. The left-hand end of shaft 173 is provided with an internal ball bearing whereby it is mounted to turn about a fixed cone 176 threaded through side plate 22 and locked in position by nut 177. The shaft 173 extends through the hollow center of roll 160, and the right hand end thereof is mounted by anti-friction bearing balls 178 in end member 165. The roll 150 is thus mounted between the side plates for turning movement relative to shaft 173 with a minimum of friction.

An operating means in the form of a spring motor is mounted between shaft 173 and the interior walls of roll 160. This spring motor may be of any suitable construction, the forms shown being two concentrically wound springs 180 and 181, the smaller diameter spring 180 being disposed within the larger spring 181. The two springs 180 and 181 are connected in series by suitably joining their right hand ends, while the left-hand end of the inner spring 180 is connected to the shaft 173 and the left-hand end of the outer spring 181 is connected to roll 160. The end of spring 180 is shown as bent inwardly to enter a depression in shaft 173, and the end of spring 181 is bent outwardly to likewise enter a depression in the interior of roll 160. This spring motor is tensioned by turning shaft 173 in a counterclockwise direction as viewed in Fig. 6 to exert a force tending to turn roll 160 in a counterclockwise direction. The means for turning shaft 173 to supply this tension will be later described.

The roll 160 is normally held by an escapement mechanism against rotation by the spring motor. This escapement mechanism includes a five tooth wheel 185 on the right-hand member 165, and one tooth of this wheel normally engages an escapement dog 186 carried by a rocker member 187. The rocker 187 is pivotally mounted to turn about a vertical axis by a conical pin 188 secured to a bracket 189 and the conical end of a screw 190 also carried by bracket 189. The bracket 189 is mounted by screws 191 on side plate 23, and this mounting may be arranged to afford slight adjustment of bracket 189 about the axis of roll 160. The teeth of the escapement wheel 185 are spaced corresponding to the five grooves in roll 160.

Figure 8:
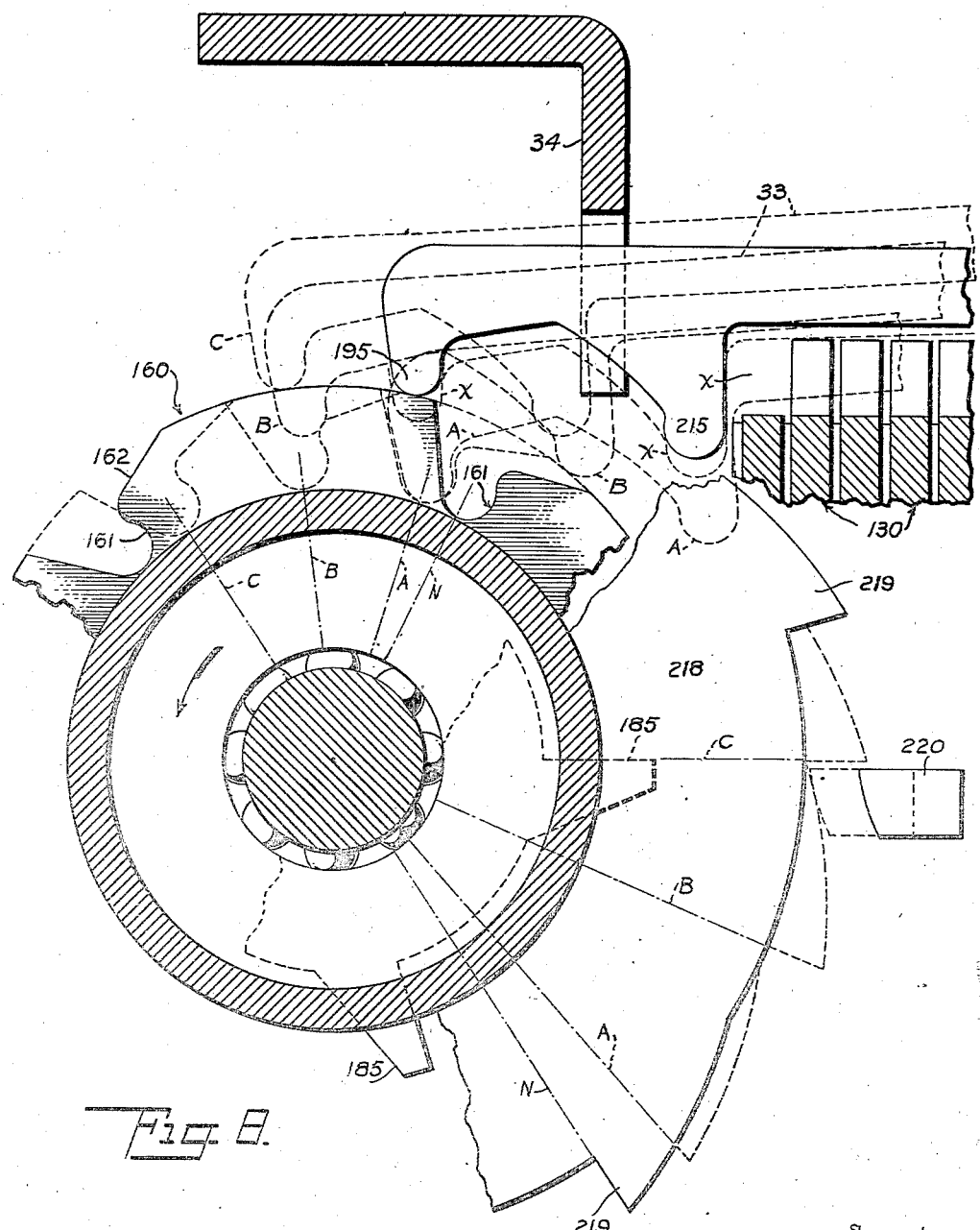
Fig. 8 is a greatly enlarged side sectional view of a portion of the character selecting mechanism.

Referring to Figs. 6 and 8, it will be seen that the extreme rearward end of each of the pull links 33 is provided with a depending tooth 195 which is normally held by the force of the associated spring 36 into engagement with the outer peripheral portion of roll 160 when the roll is held in normal position by the escapement mechanism. The lower edges of all of the pull links 33 are spaced slightly above the upper edges of selector bars 130 in this normal position and accordingly the bars are free to be moved by their associated springs 143. This movement of the selecting bars has been described as being initiated by energization of one or more of the electromagnets to cause attraction of their armatures and release the corresponding selector bars.

In the present arrangement, an operation of one or more of the bars 130 operates mechanism to turn the escapement rocker 187 and move dog 186 out of the path of the engaged tooth of the escapement wheel 185. This permits one-fifth of a revolution of roll 160 under the force of the spring motor. Referring to Fig. 9, it will be seen that the mechanism for moving rocker 187 by movement of the selector bars 130 includes a pivoted universal bar 200, the upper portion of which is slotted to form individually bendable fingers cooperating with depending portions 201 on the selector bars 130. An ear portion 202 and an upstanding arm portion 203 are bent over at the bottom of the universal bar 200, and a pivot screw 204 extends through openings in these portions to mount the universal bar for free pivotal movement. The pivot screw 204 may be threaded into the depending left hand side portion of cross member 110. A horizontal link 206 is pivotally connected at its right-hand end at 207 to the upper end of arm 203, and the left hand end of link 206 is threaded into an elongated nut 208 which is locked in adjusted position thereon by nuts 209. The smaller diameter portion of nut 208 is received in an opening in a forwardly extending arm 210 on the escapement rocker 187.

It will now be clear that whenever one or more of the selector bars 130 are moved to the right as viewed in Fig. 9 under the force of their springs 143, the universal bar 200 will be rocked in a clockwise direction, and thereby move the escapement rocker 187 through link 206. This moves the escapement rocker 187 in a clockwise direction as viewed in Fig. 7 to move dog 186 out of the path of a tooth of the escapement wheel 185 and thereby allow rotation of roll 160 under the force of the spring motor.

During one cycle or one-fifth of a revolution of the roll 160, one of the pull links 33 is selected and operated to cause printing operation of the associated type action, and a detailed description of this cycle of operation will now be made with reference to Fig. 8. In Fig. 8, the normal position of the various parts are shown in solid lines, and certain instantaneous positions which the parts assume during a cycle of operation are represented by dotted lines. Radial lines are employed to represent various angular positions of the rotating parts, and these radial lines are provided with reference letters corresponding to the reference letters applied to the corresponding dotted line positions of parts operated by roll 160.

In the normal position N of roll 160, the lower end of the hook portion 195 of all of the pull links 33 engage the outer concentric surface of the roll at a point near one of the grooves. Consequently when the roll has turned in a counter clockwise direction only a short distance to angular position A, the hook portions 195 of the links are disposed above this groove in the roll. The springs 36 then act to move the front end of all of the pull links 33 downwardly into cooperative relations with the selector bars 130. At any combination of positions of the selector bars 130, a tooth on at least one of the bars will be disposed beneath each of the series of pull links except one, where a notch on each of the bars will be disposed beneath its lower edge. Thus at position A of the roll, one of the pull links will move to its dotted line position A while all of the other links will move downwardly only to position X wherein they engage the upper surface of a tooth on at least one of the selector bars 130.

During the continued movement of the roll in a counter clockwise direction, the selected pull link, which has moved into a groove of the roll, is pulled forwardly by the surface 161 to cause a printing operation of its associated type action. In order to remove the hook portion 195 of the selected pull link from the groove, a depending portion 215 is provided on each of the pull links. As the pull link approaches the end of its forward movement, the depending portion 215 engages the outer concentric surface of roll 160 to cause the pull link to be lifted upwardly as shown at position B until the hooked portion 195 is lifted from the groove. An inclined portion 162 of the roll then engages the rounded lower end of the hook portion 195 to cam the pull link upwardly as the momentum of the type bar moves it forwardly until the link assumes its position shown at C. Printing operation of the type action is then completed, and the returning spring 36 then acts to return the type action and the pull link to normal position. During this return movement, the rounded lower end of the hook portion 195 slides rearwardly over the concentric outer surface of roll 160. The inclined portion 162 also functions during the initial portion of the operating movement of roll 160 to provide the slight lifting movement required to return the non-selected pull links from position X to their normal position.

In order to return the selector bars 130 and the escapement mechanism to their normal positions, a cam member 218 is formed on the outer rim of the roll end member 165. This cam member 218 is provided with five equally-spaced camming portions 219 which coact with the end of an arm 220 on the escapement rocker 187. When the roll is released by operation of the escapement, the end of arm 220 moves inwardly between the camming portion 219, to its dotted position shown in Fig. 8, and it will be noted that a camming portion 219 does not engage the arm 220 in this position until the roll 160 has reached its angular position B. At position B, it will be noted that the selected pull link has been moved upwardly to a position wherein its lower edge is disposed above the upper edge of the selector bars 130, and likewise the non-selected pull links have been raised to their normal position. The selector bar is also retained in this elevated position during its return movement due to arrangement whereby the rounded lower end of portion 195 travels over the concentric outer surface of roll 160. The selector bars 130 may, at this point, be returned to their normal position without interfering with the elevated pull links 33, and a camming portion 219 then acts on lever 220 to move it outwardly from roll 160 thereby turning the escapement rocker 187 in a counter-clockwise direction as viewed in Fig. 7.

This movement of the escapement rocker acts through link 206 and the universal bar 200 to return all of the selector bars slightly beyond their normal position. At the same time, the dog 186 of the escapement rocker is moved into the path of an approaching tooth of escapement wheel 218 so that the turning movement of roll 160 is arrested after it has made one-fifth of a revolution. After the camming portion 219 passes the end of arm 220 and reaches position C, the arm 220 of the escapement rocker is free to move inwardly towards the roll, but after it has moved inwardly only a slight distance, a latch movement 138 on each of the selector bars engages the lower notch on the associated stop member 140 to hold each of the selector bars in its normal position.

It will be noted that the selector bars 130 and escapement mechanism are returned to their normal positions during the forward or printing movement of the selected pull link 33, or in other words the returning movement of the selector bar occurs before the pull link reaches its forwardmost position C. After the roll 160 has reached its angular position C, it will be clear that an energization of one of the electromagnets will then be effective to afford movements of its associated selector bar by operating latch 138 thereby initiating a subsequent selecting operation at this point. In other words, when the parts have reached position C, a subsequent selecting operation may be started and executed during the return movement of the selected pull link from position C to its normal position, during which time the roll 160 has completed its cycle of movements from position C.

Thus it will be clear that the returning movement of the selector mechanism is effected during the forward movement of the type action so that at the end of the printing operation a subsequent selection may be started to allow the selection to be made while the parts which operated the type action are returning to normal position. Thus, the selection may be completed upon the return of the type action to normal position so that the next selected printing operation may follow immediately. Accordingly, it may be said that the selecting and printing operations of the parts overlap during a cycle of operation of the roll 160, and this feature of the present invention affords an extremely high rate of operation.

*Automatic power storing mechanism*

An electric motor is provided for storing power in the spring motor in the present machine, and means are provided for automatically controlling the application of power to this spring motor. This arrangement includes mechanism for starting the electric motor after a certain amount of power has been removed from the spring motor and for stopping the electric motor when a predetermined amount of power has been stored in the spring motor.

Referring to Figs. 1, 7, 11, and 12, it may be seen that a gear wheel 230 is securely attached to the extending end of the shaft 173 which extends through the center of the spring motor. The gear 230 is driven by a gear 231, which may be of a suitable non-metallic substance to reduce noise; and the gear 231 is in turn driven by a pinion gear 232. The pinion gear 232 is secured to a shaft 233 of an electric motor 235 which may be of any suitable construction either with the armature mounted on shaft 233 or it may be found desirable to employ a motor having speed reducing mechanisms. The shaft 173 and gear 230 are driven in a counter-clockwise direction as viewed in Fig. 11 to wind the spring motor including springs 180 and 181, and this requires the intermediate or idler gear 231 to turn in a clockwise direction.

In order to prevent the escape of the power stored in the spring motor when the electric motor is deenergized, an arrangement is provided for preventing gear 231 from turning in a counter-clockwise direction thus permitting free movement in a clockwise direction. Referring to Figs. 11 and 12, the gear 231 is securely attached around a metal ring 238, and rollers 239 are provided between the inner surface of ring 238 and the hub portion of a stationary member 240 secured to side plate 22 by a bolt 241 and nut 242. Radially extending arms 243 are provided on the stationary member 240, and a spring 244 is provided between each of these arms and the associated one of the rollers 239. When the gear 231 is turned in a clockwise direction, the rollers turn between the ring 238 and the concentric hub portion of the stationary member 240, but when a force is applied tending to turn gear 231 in a counter-clockwise direction, the springs 244 force the rollers into engagement with the inclined surfaces of the radial arms 243 so that the rollers wedge between the interior surface of ring 238 and these inclined surfaces to securely block any counter-clockwise rotation of gear 231. This means for preventing counter-clockwise rotation of gear 231 acts through gear 230 to prevent clockwise rotation of shaft 173 so that the spring motor reacts against this gear 231 in driving roll 160.

The automatic control of the electric motor 235 is effected through two independently operable Geneva-wheel mechanisms which jointly control a contact operating device. One of these Geneva-wheel mechanisms is operated by roll 160 to cause the contact to be closed after a predetermined number of printing operations, and the other Geneva-wheel mechanism is controlled by rotation of shaft 173 to cause the contact to be opened after the electric motor has turned the shaft through a predetermined number of revolutions. One of these Geneva-wheel mechanisms includes a single tooth Geneva pinion 250 formed on the end member 170 of roll 160, and pinion 250 cooperates with a Geneva wheel 251. The other Geneva-wheel mechanism is very similar and comprises a single tooth Geneva pinion 254 mounted on shaft 173 to cooperate with a Geneva wheel 255. The Geneva wheels 251 and 255 are mounted on respective hubs 256 and 257 which are mounted to turn independently about a pivot screw 258 secured to sideplate 22.

A spindle 260 is rotatively mounted between the sideplate 22 and a bracket 261 secured at 262 to the sideplate. This spindle carries a sprocket wheel 265 having six teeth, three of which are offset in one direction to move in a path adjacent one of the Geneva wheels, and the other three teeth interspaced therewith are offset in the other direction to move in a path adjacent the other Geneva wheel. A pin 267 on Geneva wheel 251 cooperates with only three of the teeth of the sprocket wheel 265, and a pin 268 on Geneva wheel 265 cooperates only with the other three teeth of the sprocket wheel. A contact operating cam 270 is also attached to the spindle 260, and the cam cooperates with an insulated block at the end of a moveable contact 272 which is moveable into and out of electrical contact with a stationary contact member 273. The contacts 272 and 273 are mounted by screws 274 in insulated relation on a depending portion of bracket 261.

It will be clear that each Geneva wheel will be indexed one tooth space at the end of one complete revolution of the associated pinion, and the present form of Geneva wheel is illustrated as having twelve teeth so that twelve revolutions of either the roll 160 or the shaft 173 is required to make one complete revolution of the associated Geneva wheel. Both of the Geneva wheels 251 and 255 are shown in a position wherein the spring motor is completely wound and contacts 272—273 are open. Thus, after the roll 160 has completed twelve revolutions to type sixty characters, the Geneva wheel 251 will have turned one complete revolution in a clockwise direction as viewed in Fig. 11. During the printing of the sixtieth character, or the last one-fifth revolution of drum 160, the pin 267 will engage and operate a tooth of sprocket wheel 265. This operation of the sprocket wheel will turn the cam wheel 270 in a counter-clockwise direction as viewed in Fig. 11 to bring a high portion of the cam wheel into engagement with the insulated block on contact 272, thereby moving contact 272 into engagement with contact 273. The contacts 272—273 are arranged to control the energization of the electric motor 235, and accordingly after the sixtieth character has been printed, the motor is energized to start to wind the spring motor through gears 232, 231, and 230.

A detent means is provided to hold the sprocket wheel 265 in its last operated position, and to insure that it is fully operated to such position. For this purpose, a roller 280 is mounted on an arm 281 which is pivoted at 282 to the sideplate 22. A spring 284, extending between the bracket 261 and arm 281, holds the roller 280 in an interdental space of sprocket wheel 265 to thereby hold the sprocket wheel in its operated position, and this arrangement also provides a quick action of the wheel to its fully operated position.

When contacts 272—273 have been closed as previously described, the motor causes shaft 173 to be turned throughout twelve revolutions, thereby causing the Geneva wheel 255 to make one complete revolution. At the end of this revolution of Geneva wheel 255, the pin 268 engages and operates a tooth of sprocket wheel 265 thereby causing cam wheel 270 to move to a position wherein the abrupt edge of its cam surface passes the edge of the insulating block of contact 272 to allow contacts 272—273 to abruptly open. Thus, the opening of contacts 272—273 deenergizes motor 235 after the spring motor has been completely wound.

The rotation of roll 160 may of course continue in the operation of the machine for the typing of characters during the winding of the spring motor, and it is preferable that the electric motor should develop sufficient speed to rotate shaft 173 at a speed greater than can be assumed by roll 160 during operation of the machine. The electric motor 235 may be continuously connected to its source of power, and it will be clear that the winding of the spring motor is entirely automatic and requires no attention whatsoever from the operator.

*Remote control*

It has been described that in the present machine, the manual operation of the key levers operates code forming members which control contacts electrically connected in the same machine to control selector magnets which cause printing of the selected character at the same machine, without any mechanical operating connections between the key levers and the printing mechanism. From this it will be obvious that the code forming contacts may be connected into electrical circuits for controlling the energization of the selector magnets at one or more other machines of the same kind, to thereby cause simultaneous printing at several machines by the operation of the keyboard at only one machine.

Various means for electrically connecting two or more machines of the type described may be employed, and in Fig. 15 a very simple method of electrically connecting two machines has been shown diagrammatically as including six individual wires plus a common wire for connecting the six electromagnets 112 of two machines in parallel. The power for operating this system may be obtained from the usual alternating current source through a line plug 290 whereby the electric motor 235 may be automatically connected to this source through contacts 272—273. A transformer T and full-wave rectifier R is shown for supplying direct current from this alternating current source, and a set of contacts 291—292 is provided to connect the primary of transformer T to the alternating current source when it is desired to operate the system from the keyboard of that machine.

Referring to Fig. 1, the moveable contact 291 may be operated by a vertical slide 293 mounted on screws 294 adjacent the side plate 22, and the upper end of slide 293 carries a pin 295 cooperating with a detented cam 296 having a forward extending portion of manual operation. A downward movement of cam 296 lifts the slide 293 to close contacts 291—292 to supply power to the transformer and rectifier for operating this system from the keyboard of the machine at which the cam 296 has been operated.

One of the direct current output wires of the rectifier R is connected through the two sets of common contacts 105—106 in parallel to all six code forming contacts 93, which for convenience have been designated as 93A through 93F. Each of the moveable code-forming contacts 91 is connected to its associated electromagnet 112, and likewise these contacts and magnets have been individually designated by the suffix letters A through F. The other side of each of the electromagnets 112 is connected to a common wire 300, which is in turn connected to the other output wire of the rectifier R. In operating any one of the machines, the depression of a key lever will close one of the code-forming contacts 91—93 and will subsequently close the two sets of common contacts 105—106.

Individual electrical resistance unit 302 is connected across each set of common contacts 105—106. These resistances are of relatively high value and limit the current flow, when contacts 91—93 are closed and contacts 105—106 are open, to a value which will not cause attraction of the armatures of the electromagnets, and will not retain these armatures in attracted position.

The function of these resistances 302 is to divide the total current in the circuit between the two sets of common contacts so that the amount of current controlled by each set of common contacts is in proportion to the value of the individual resistance connected thereacross. The two sets of contacts 105—106 make and break the total current used in operating the electromagnets of the system inasmuch as these contacts close after the individual contacts have closed, and open before the individual contacts open, thereby relieving the individual contacts of the damaging function of opening or closing the circuit while current is flowing. This feature concentrates the entire contact wear on the two sets of common contacts, and the arrangement of the resistances connected across each of these common contacts distributes the load through each set so that neither set controls a sufficient amount of current to seriously damage the contact surfaces during operation. This is a particular feature of the present electrical system inasmuch as it provides greatly increased contact life and much more reliable operation.

In Fig. 15, six wires are shown designated by the reference letters A through F for interconnecting one side of the winding of the six electromagnets 112 of one machine with the corresponding side of the electromagnets 112 of the second machine, and the common wire 300 connects the other side of all of the electromagnets at one machine to the corresponding side of all of the electromagnets at the other machine. Thus, when a key lever at one machine is operated to close certain of the code-forming contacts and the common contacts, current flows through the electromagnet at the same machine as well as the corresponding electromagnet at the other machine, the return path for the current being over the common wire 300 to the rectifier R at the machine where the key lever is operated.

In this manner, it will be clear that two machines may be electrically connected by seven wires to cause simultaneous printing at both machines by the operation of a key lever at only one machine. Although only two machines are shown in the system in Fig. 15, it will be clear that more than two machines could be interconnected electrically in the same manner to simultaneously print the selected characters at all machines. The various machines operated in this system may be physically located substantially any distance from each other, and various types of switching or selecting arrangements may be employed to selectively operate any one or more machines from a large group of machines.

A teletypewriting machine has thus been provided wherein the use of an automatically wound spring motor for operating the selecting and printing mechanism permits the machine to instantly start operation without any preliminary conditioning operation, and no attention need be given the machine upon stopping. In operating the machine, it will be noted that the key levers operate code forming members only, and their members are arranged to prevent effective operation of more than one key lever at one time. The code forming members operate contacts which control individual translator magnets all of which operate simultaneously to trip individual selector members to initiate selection and operation of a type bar by the spring motor.

A single rotary member or roll has been provided for selecting and operating the type bars, and during a continuous movement of this roll in one direction, one of the series of type bar operating links is selected and operated and the selector members are returned to normal position before the type bar returns from its operated position. This feature of the present invention contributes to maximum operating speed inasmuch as a character may be selected during the cycle of operation of the type bar previously selected. The speed and reliability of operation of the present machine is further increased by the improved distribution of the type bars in the type basket to reduce the possibility of type bar collision. This feature is obtained without sacrificing the usual standard typewriter keyboard by the elimination of all mechanical operating connections between the key lever and type bars.

The fundamental novel features of the present invention have been shown and described as applied to a single form, and it will be understood that various omissions, substitutions and modifications in the form and details of the device illustrated and in its operation may be made by those skilled in the art without departing from the spirit of the invention. It is intended therefore to be limited only as indicated by the scope of the following claims.

The invention claimed is:

1. In a typewriting machine, the combination of a set of type bars, an operating roll, selector members, links connected to said type bars and cooperating with said roll and said selector members to operate one of said type bars during rotation of said roll, means for moving all of said links out of cooperative relation with said selector members during forward operation of the type bar, and means operated by said roll for moving said selector members at the end of said forward operation of the type bar.

2. In a typewriting machine, the combination of a set of type bars, an operating roll, spring operated selector members, releasable means for latching said selector members in normal position, links connected to said type bars and cooperating with said roll and said selector members to operate one of said type bars during rotation of said roll, means for moving all of said links out of cooperative relation with said selector members during forward operation of the type bar, and means operated by said roll for returning said selector members to latched position when said links are out of cooperative relation therewith.

3. In an electrically controlled typewriting machine, the combination of a series of type bars, operating means for said type bars, selector members for controlling operation of said type bars by said operating means, spring means for moving said selector members, releasable latching means for holding said selector members in normal position against the force of said spring means, electromagnetic means for releasing said latching means, means for returning said selector members, and means affording latching operation of said latching means regardless of whether said electromagnetic means is energized or deenergized upon the return of said selector members.

4. In an electrically controlled typewriting machine, the combination of a series of type bars, operating means for said type bars, selector members for controlling operation of said type bars by said operating means, spring means for moving said selector members from normal position, a latch member pivoted on each of said selector members, a fixed stop member coacting with each latch member to hold said selector members in normal position, an electromagnet for each of said selector members, a laterally resilient arm operated by each of said electromagnets to disengage the associated latch member from its stop member, returning means for said selector members and means on each latch member effective when the associated laterally resilient arm is in operated position to cause lateral movement thereof during return movement of the selector member and allow latching thereof in normal position.

5. In an automatically controlled typewriting machine, a set of type bars, individual actuators for said type bars, a common operator for said actuators, means constantly exerting a driving force on said common operator, means normally latching said common operator against movement, means for selectively engaging said actuators with said common operator including a group of selectors, means for selectively moving said selectors from a normal position to a set position, said latching means including an escapement device moved by any set selector to release said common operator, and means whereby said common operator, when released, restores said escapement device to latching position and restores any set selector.

6. In an automatically controlled typewriting machine, a set of type bars, individual actuators for said type bars, a common driving roll for said actuators, means constantly exerting a torque on said driving roll, an escapement device normally restraining rotation of said roll, means for selectively engaging said actuators with said roll including a group of selectors, means for selectively moving said selectors from a normal position to a set position, means operated by any selector on moving to set position for releasing said escapement device, and means driven by said driving roll for restoring said escapement device to restraining position, after a partial revolution of said driving roll, and restoring to normal position any set selectors.

EDWIN O. BLODGETT.